A. S. MACDONALD.
CASE.
APPLICATION FILED AUG. 4, 1916.

1,264,412.

Patented Apr. 30, 1918.
5 SHEETS—SHEET 1.

WITNESS:

INVENTOR
Angus S. Macdonald
BY
ATTORNEYS

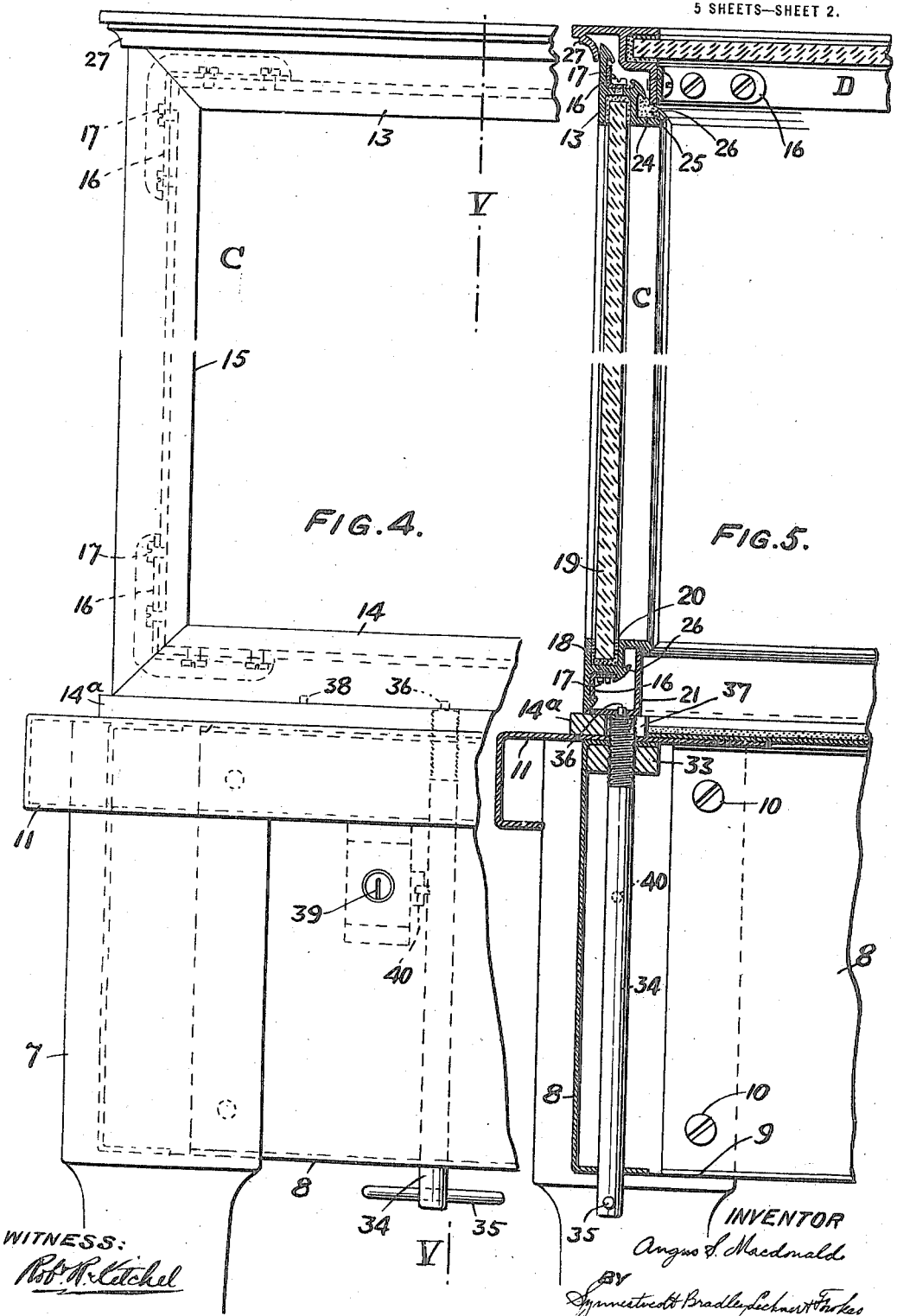

A. S. MACDONALD.
CASE.
APPLICATION FILED AUG. 4, 1916.

1,264,412.

Patented Apr. 30, 1918.
5 SHEETS—SHEET 3.

WITNESS:
Robt R Kitchel.

INVENTOR
Angus S. Macdonald
BY
ATTORNEYS.

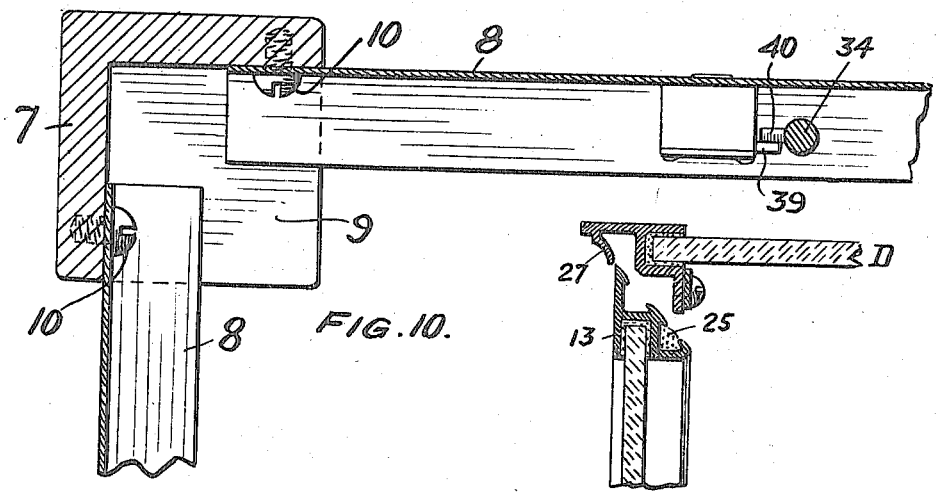
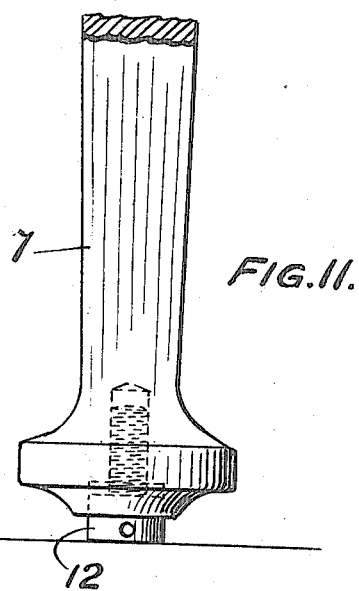
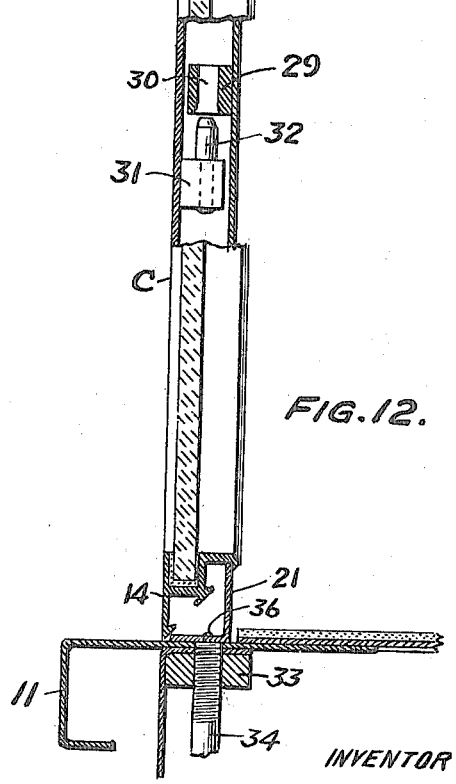

A. S. MACDONALD.
CASE.
APPLICATION FILED AUG. 4, 1916.
1,264,412.
Patented Apr. 30, 1918.
5 SHEETS—SHEET 5.
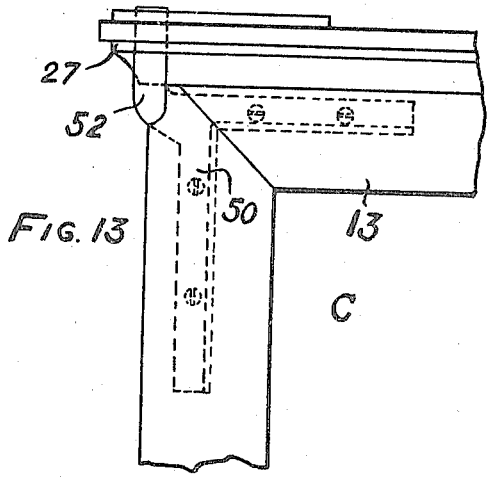
Fig. 13
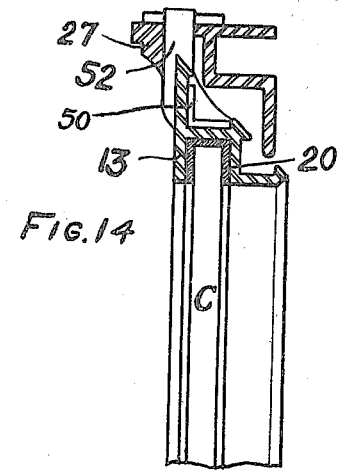
Fig. 14
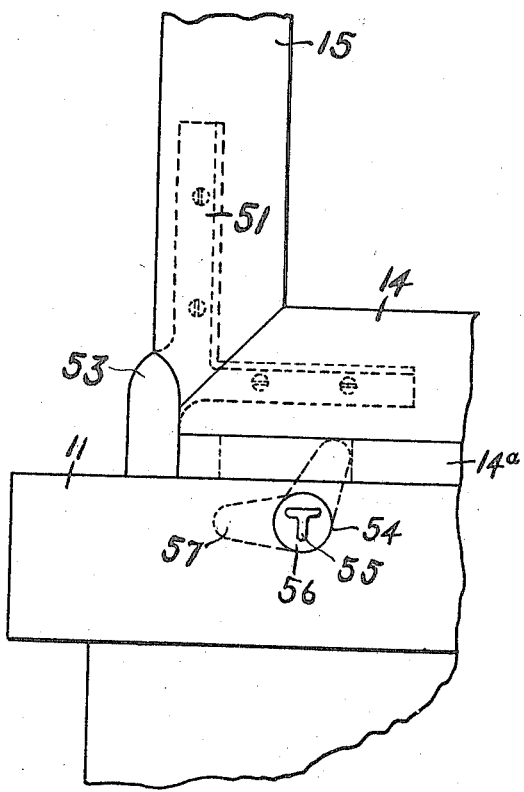
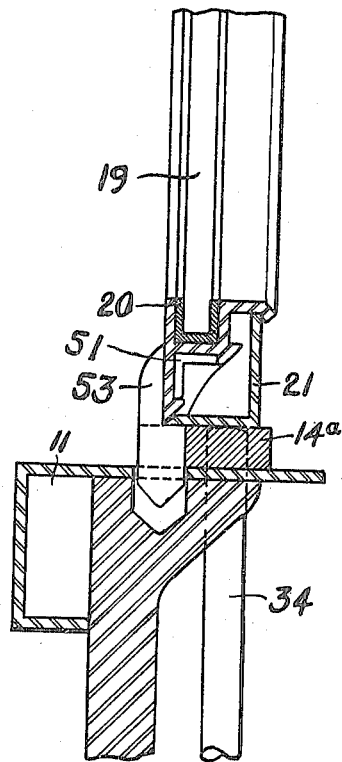

UNITED STATES PATENT OFFICE.

ANGUS S. MACDONALD, OF GREAT NECK STATION, NEW YORK, ASSIGNOR TO THE SNEAD & CO. IRON WORKS, OF JERSEY CITY, NEW JERSEY, A CORPORATION OF NEW JERSEY.

CASE.

1,264,412.  Specification of Letters Patent.  Patented Apr. 30, 1918.

Application filed August 4, 1916.  Serial No. 113,034.

*To all whom it may concern:*

Be it known that I, ANGUS S. MACDONALD, a citizen of the United States, residing at Great Neck Station, county of Nassau, and State of New York, have invented certain new and useful Improvements in Cases, of which the following is a specification.

This invention relates to cases, such for example as museum cases and the like, and it has for one of its primary objects the provision of an improved sectional case which is simple in construction and the parts of which may be readily manipulated. A further object of the invention is to provide an improved case in which one or more of the walls may be readily removed to afford access to the interior of the case. My invention also contemplates the provision of an improved sectional case in which all of the sections are securely but detachably fastened in place, the fastening means being entirely invisible. Among the more specific objects of my invention are the provision of improved means for detachably fastening the sections of a sectional case in position; and the provision of an improved construction of detachably interlocking case sections. Still another object of my invention is the provision of an improved case having the characteristics described which is also dust and vermin proof and in which the sections may be readily locked after they have been placed in assembled relation.

The foregoing, together with such other objects as may hereinafter appear or are incident to my invention I attain by means of a construction, one embodiment of which I have illustrated in preferred form in the accompanying drawings, wherein—

Figure 1:
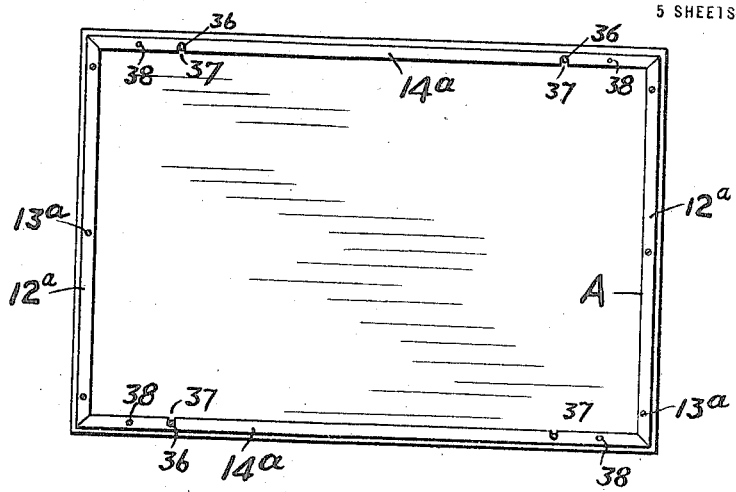
Figures 2, 3:
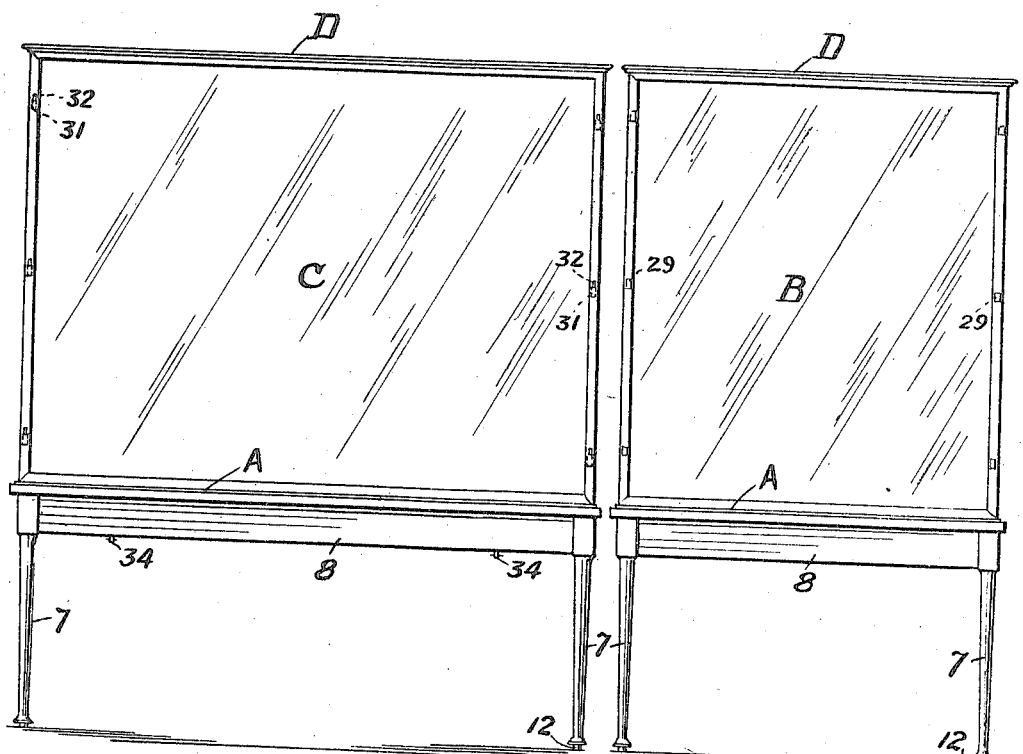
Figure 6:
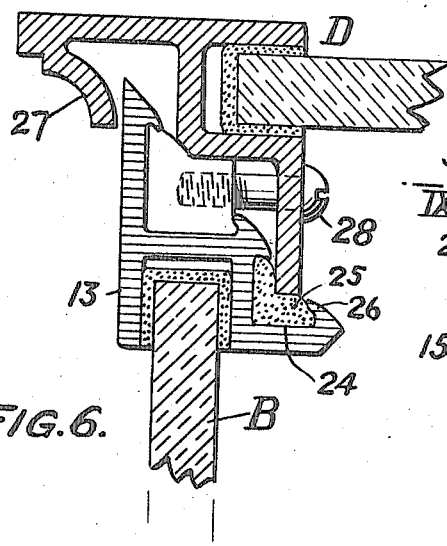
Figure 8:
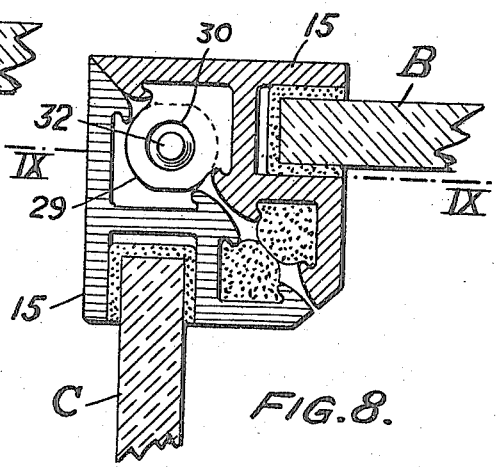
Figure 7:
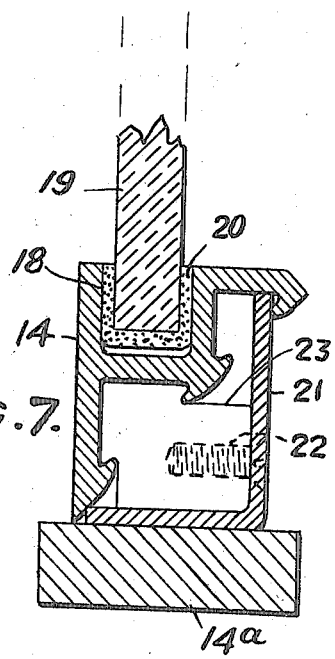
Figure 9:
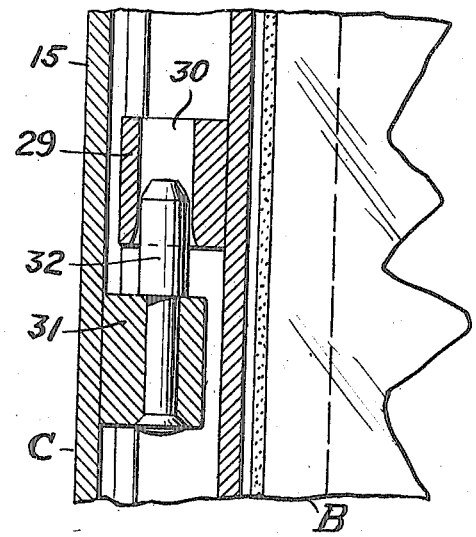

Figure 1 is a plan view of the table on which the case is supported, the case, however, being removed to illustrate the construction of the removable frame parts by means of which the sections of the case are held in position; Fig. 2 is a side elevation of a table and case; Fig. 3 is an end elevation of Fig. 2; Fig. 4 is a partial side elevation of one end of a side of the case drawn on an enlarged scale; Fig. 5 is a section on the line V—V of Fig. 4; Fig. 6 is a vertical section through the upper portion of an end section of the case; Fig. 7 is a similar section of the lower portion of an end section of the case; Fig. 8 is a horizontal section through a corner of the case at the intersection of the side and end sections showing the interlocking means for detachably fastening the sections together; Fig. 9 is a sectional view taken on the line IX—IX of Fig. 8; Fig. 10 is a horizontal section through the top portion of one of the legs of the table showing the manner in which the curtains are secured to the posts and also the manner in which the releasing means for the supporting frame are locked; Fig. 11 is a partial side elevation of the table leg; Fig. 12 is a vertical section through a side of the case showing the manner in which a side section is released from the remaining sections when the supporting frame has been removed; and Figs. 13 and 14 are respectively a partial side elevation of one end of a side of the case and a partial vertical section of the same illustrating modifications of the invention.

Referring now to the drawings, the construction of the table will first be described. The legs 7 of the table are preferably cast and are flanged at the top to receive the four curtains 8, such curtains being preferably composed of sheet metal stamped in the form of a shallow channel in order to secure rigidity. The curtains rest at their ends upon the supporting surface 9 and are fastened to the flanges of each post by means of the studs 10. Resting upon the top of the posts and also upon the tops of the curtains is a sheet metal top member 11. Leveling studs 12 are threaded into the bottom of each leg to level the table. Lying upon the member 11 is a supporting frame A, which frame is composed of two end pieces 12$^a$ which end pieces are secured in position by means of screws 13$^a$, and two side pieces 14$^a$, either one or both of which may be removed. The sections of the case rest upon this supporting frame A in a manner to be described, the removable piece or pieces of the frame serving as a means for detachably retaining the sections in interlocked relation, as will appear.

The case comprises two end sections B, two side sections C, and a top section D. Any or all of the side and end sections may be made removable, but in the construction shown, the side sections C are made removable. Each section is composed of a framework consisting of four pieces mitered together and having the abutting faces of adjacent frames dressed to form a mitered joint between the sections. The abutting faces of the side and end sections and also of the top section are dressed so as to form a mitered joint therebetween. The specific construction of the frame of one of the side sections C will now be described, attention being directed to Figs. 4 and 5. The frame comprises a top piece 13, a bottom piece 14, and two end pieces 15, mitered at their corners. The pieces are held in position by means of angle members 16 and studs 17, in the manner shown in dotted lines in Fig. 4, and in section in Fig. 5. Each piece of the frame is provided with a groove 18 adapted to receive a glass 19, strips of poisoned felt 20 being interposed to make a tight dust and vermin proof joint. Fastened to the bottom of each of the end pieces 14 of the side frames is a supporting angle 21 on which the section is adapted to rest. These angles 21 are held in position by means of screws 22 which enter into screw holes in lugs 23 formed on the bottom pieces 14. (See Fig. 7). The inner faces of the pieces constituting the frames are, as pointed out, dressed down to an angle of about 45 degrees and are also provided with longitudinally extending grooves 24 adapted to receive strips of dust proofing 25, such dust proofing being retained in position in the grooves 24 by means of the inturned lips 26. The dust proofing projects beyond the inner face of the frames so that when two frames are brought together, the dust proofing will be compressed to form a tight joint. The side sections C rest upon the removable members 14ª of the supporting frame A heretofore described, as shown in Figs. 4 and 5.

The framework of the end sections B is in all substantial respects the same as that of the side sections C but each end section instead of merely resting upon the suporting frame A, is secured to an end piece 12 of such frame. The top section D of the case is also comprised of a four-piece frame work of substantially the same construction as that of the side sections C, but the frame members of this section have downwardly projecting cornice pieces 27 adapted to extend below the top edges of the end and side sections. These cornice pieces engage the side and end sections, thereby positioning the top section with respect thereto. A dust proof joint between the top section and the side and end sections is obtained by reason of the engagement of the frame of the top section with the dust proofing carried in the upper pieces of the side and end sections. The top pieces of the framework of the end sections B are rigidly secured to the corresponding pieces of the section D by means of the screws 28 (see Fig. 6).

From the description thus far given it will be noted that the end sections B are secured to the stationary pieces 12 of the supporting frame A carried on the top of the table, and the top section D is in turn secured to both end sections B at the tops thereof. The side sections C are directly held in position with respect to the framework of the section D by the depending cornices 27 and indirectly by the means whereby the side sections and the end sections are detachably interlocked. This interlocking means will now be described, attention being directed particularly to Figs. 8 and 9.

From inspection of these figures it will be seen that each end piece 15 of the frame of sections B is provided with a plurality of lugs 29 preferably three in number, one being located about the middle and the others near the ends. These lugs are each provided with an aperture 30. The corresponding end pieces 15 of the frame of the sections C are also provided with corresponding lugs 31, such lugs carrying pins 32 adapted to fit into the apertures 30 of the lugs 29. It will be seen that by this construction, when the side sections C are brought into engagement with the faces of the end sections and are then raised, the pins 32 will engage the apertured lugs 29, thus locking the side sections and the end sections together. When the side sections have been thus interlocked the removable pieces 14ª of the supporting frame A are then inserted beneath the side sections and serve to retain the side sections in interlocked relation. It will be understood that when the side sections are raised in the manner described, the top edges of the frames of the sections will slide past and within the cornices 27.

The mechanism for conveniently operating the side sections C will now be described, attention being directed particularly to Figs. 4, 5 and 12. A pair of strips 33 extend longitudinally of the table, one on each side thereof, on the inside of the side curtains 8. A pair of pins 34 are mounted in the side curtains 8, one adjacent to each end thereof, and are threaded into the strip 33, each pin being provided with an operating handle 35 and also with a teat 36 at the upper end. When the pins are turned they engage the angle 21 of the side section, thereby raising the side section, causing the side and end sections to interlock. When the section has been raised to upper position, the corresponding side piece 14ª of the supporting frame A is shifted into position beneath the section, the members 14ª being provided with recesses 37 for this purpose, the recesses being so located as to come opposite the pins 34. When the strips 14ª are in position, the pins are turned counterclockwise and the side sections are lowered slightly until they rest upon the top of the strips 14ª. From this construction it will be seen that the pieces 14ª cannot be removed by pulling them out longitudinally of the case because of the pins 34. They cannot be removed by pulling them outwardly because of the teats 38 which are provided therefor and which are adapted to engage with the lower faces of the side sections. In order to prevent tampering with the case, each of the pins 34 is locked by means of the locking member 39 adapted to engage the pins 40, which prevents rotation of the pins 34.

When the case is first assembled the normal operation would be as follows, assuming that the table upon which it stands has already been assembled in the manner indicated. The end pieces 12ª of the frame A are secured to the table and one of the removable side pieces 14ª is placed in position with the pins 34 therebeneath properly turned up and locked. On this side piece 14ª a side section C is set up after which follow the two-end sections B, the interlocking means provided being thereby immediately engaged so that no further manipulation of the pins 34 is required until it is desired to dis-assemble the case or to remove the side section C for the purpose of obtaining access to the interior of the case. The top section D is now placed in position and secured to the end sections B, as before explained, leaving only the remaining side section C to be put into place, which is accomplished by turning the pins 34 to elevate the section until the pins 32 interlock with the lugs 29. The remaining side piece 14ª of the frame A is then inserted beneath this section C and the pins 34 are turned so as to slightly lower it until it rests upon the piece 14ª, after which the pins are locked. When the parts are thus assembled, all of the sections are securely held in position, the joints are vermin and dust proof, and access cannot be had to the interior of the case save only by breaking the locks or by breaking the glass. At the same time either of the side sections can be readily removed without disturbing the remaining parts of the case. It will also be noted that no part of the fastening means is visible and only lines of the meeting faces can be seen. In addition to the artistic appearance of the case, it will be noted that the construction is very simple and rigid and also easy to manipulate.

In Figs. 13 and 14 is illustrated a modification of the invention showing how the removable sections may be pivoted to swing open instead of having to be bodily removed from their places. The upper and lower corners of one end of a section are provided with forgings 50 and 51 which serve to hold together the adjacent sides mitered at the corner, and from which suitable pivoting lugs 52 and 53 project outside the section and are adapted to fit into holes in the cornice 27 and the table top 11. When the section is in lowered position, that is when the piece 14ª is removed and the pins 34 are screwed out to drop the section as hereinbefore described, then the top member of the section will clear the cornice 27 and thus be free to swing open.

In Fig. 13 is illustrated diagrammatically another form of lock 54 for securing the case against being tampered with, which can be used in place of that already described. A key adapted to fit into a slot 55 in the barrel 56 operates the cam 57. When this cam is turned to vertical position it slightly raises the section C and, upon further revolution, allows it to sink down until it again rests upon the member 14ª. This, of course, prevents the return of the cam to horizontal position. The cam is adapted to project through a slot in the member 14ª thus preventing the removal of said member when in locked position.

I claim:—

1. In a sectional case, the combination of side and end sections, the side and end sections having interlocking means operable by movement of the sections relative to each other, and means beneath a section normally holding the sections in interlocked relation.

2. In a sectional case, the combination of side and end sections, the side and end sections having interlocking means operable by movement of the sections relative to each other, and removable means beneath a section normally holding the sections in interlocked relation.

3. In a sectional case, the combination of interiorly recessed frames for the sections, and coöperating interlocking means each located in said recess, an interlocking means being operable by movement of the sections relative to each other.

4. In a sectional case, the combination of side and end sections and a top section with which said first mentioned sections interlock by relative movement of translation, and detachable interlocking means for one of said first mentioned sections whereby said sections may be detached without disturbing the other sections.

5. In a sectional case, the combination of side and end sections and a top section having a depending cornice, the abutting faces of the sections being mitered and the top of the side and end sections extending within the cornice.

6. In a sectional case, the combination of relatively fixed end sections, a top section carried thereon and side sections interlocking with the end sections, one of said side sections being detachable from the end sections without disturbing said end sections and the top section.

7. In a sectional case, the combination of a plurality of relatively movable section frames, interlocking means for detachably locking said sections together, and a removable support normally holding said sections in interlocked relation but permitting relative movement of the sections when removed.

8. In a sectional case, the combination of a plurality of relatively movable section frames, interlocking means for detachably locking said sections together, and a removable support normally holding said sections in interlocked relation but permitting relative movement of the sections when removed together with means for releasably locking the said support in position.

9. In a sectional case, the combination of a plurality of sections one of which is relatively movable, interlocking means for locking said movable section in position, releasable when said section is lowered, and means for raising and lowering said section.

10. In a sectional case, the combination of a plurality of sections, one of which is relatively movable, interlocking means for locking said movable section in position, releasable when said section is lowered, means for raising and lowering said section and means for locking said means for raising and lowering the sections.

11. In a sectional case, the combination of a plurality of sections one of which is relatively movable, interlocking means for releasably locking said section, said releasing means being operable by raising and lowering said section, a removable support normally holding said section in raised and locked position, and means for raising said section whereby said support may be removed.

12. In a sectional case, the combination of a plurality of sections one of which is relatively movable, interlocking means for releasably locking said section, said releasing means being operable by raising and lowering said section, a removable support normally holding said section in raised and locked position, and means for raising said section whereby said support may be removed, said support having means engaging said section when the support is in operative position preventing dislodgment of said support.

13. In a sectional case, the combination of a plurality of sections one of which is relatively movable, interlocking means for releasably locking said section, said releasing means being operable by raising and lowering said section, a removable support normally holding said section in raised and locked position, and means for raising said section whereby said support may be removed, said means for raising and lowering said section preventing shifting of the said support.

14. In a sectional case, the combination of relatively movable frames, said frames being hollow, a lug on the interior of one of said frames, a pin on the interior of the adjacent frame, said pin engaging with and disengaging from said lug when the sections are moved relative to one another.

15. In a sectional case, the combination of a plurality of sections one of which is relatively movable, interlocking means for locking said movable section in position, releasable when said section is lowered, means for raising and lowering said section, and means for locking said section in raised position.

16. In a sectional case, the combination of a plurality of sections one of which is relatively movable, interlocking means for releasably locking said section, said releasing means being operable by raising and lowering said section, a removable support normally holding said section in raised position, and means for holding said support against removal thereby locking said section in raised position.

17. In a sectional case, the combination of a plurality of sections one of which is relatively movable, interlocking means for releasably locking said section, said releasing means being operable by raising and lowering said section, a removable support normally holding said section in raised position, and a cam operated by a key for locking said section in raised position.

18. In a sectional case, the combination of a plurality of relatively movable section frames, and interlocking means for detachably locking said sections together one of which sections being provided for swinging movement.

19. In a sectional case, the combination of a plurality of relatively movable section frames, and interlocking means for detachably locking said sections together one of which sections being pivoted at an end for swinging movement.

20. In a sectional case, the combination of a plurality of interlocking sections one of which is pivoted at an end for swinging movement, and means for raising and lowering said pivoted section, said section swinging only when in lowered position.

21. In a sectional case, the combination of a plurality of sections one of which is relatively movable, said movable section being provided at the corners of one end with members adapted to hold the abutting sides of the section together and provided with projections adapted to act as pivots for permitting swinging movement of said section.

22. In a sectional case, the combination of a plurality of sections one of which is relatively movable, means for pivotally mounting said section for swinging movement, releasable locking means normally preventing said swinging movement, said means being released when said section is moved.

In testimony whereof I have hereunto signed my name.

ANGUS S. MACDONALD.

Copies of this patent may be obtained for five cents each, by addressing the "Commissioner of Patents. Washington, D. C."